United States Patent [19]
Michrina

[11] 3,863,727
[45] Feb. 4, 1975

[54] SUSPENSION SYSTEM FOR TRACKED VEHICLES

[75] Inventor: Regis C. Michrina, Lansing, Mich.

[73] Assignee: Allied Leisure, Inc., Lansing, Mich.

[22] Filed: May 10, 1973

[21] Appl. No.: 358,884

[52] U.S. Cl. ............................. 180/5 R, 180/9.2 R
[51] Int. Cl. .................... B62m 27/00, B62d 55/00
[58] Field of Search ............ 180/5 R, 9.2, 9.5, 9.52, 180/9.54; 280/5.22; 305/22, 24, 25, 27, 28

[56] References Cited
UNITED STATES PATENTS

| | | | |
|---|---|---|---|
| 3,020,059 | 2/1962 | Allen | 180/9.2 R X |
| 3,068,950 | 12/1962 | Davidson | 280/5.22 X |
| 3,688,858 | 9/1972 | Jesperson | 180/9.2 R |
| 3,707,198 | 12/1972 | Pierson | 180/5 R |
| 3,744,583 | 7/1973 | Bedard | 180/5 R |
| 3,750,775 | 8/1973 | Valentine | 305/34 |

Primary Examiner—Philip Goodman
Attorney, Agent, or Firm—Miller, Morriss, Pappas & McLeod

[57] ABSTRACT

A suspension system for tracked vehicles which includes an elongate frame movable up and down in respect to a vehicle and in parallel plane corresponding to the plane of two fixed axes over which a track passes, and establishing with said fixed axes a constant parallelogram in profile with uniform tension on the track throughout. A pneumatic spring provides a variable cushion adjustable during use and a shock absorbing structure provides a stabilizing grip on the frame or carriage.

7 Claims, 8 Drawing Figures

SUSPENSION SYSTEM FOR TRACKED VEHICLES

The present invention is a suspension system for tracked vehicles and particularly snowmobiles where an endless belt or web track is driven to provide traction for propelling the snowmobile structure. The device may also be used in other tracked vehicles, but the primary demand for the present suspension system is found in snowmobiles so that a structure can be provided which adjusts to the condition of snow and to the weight of the driver or passengers. In the prior art of snowmobile suspensions, the bogie system is usually spring loaded to attempt to apply uniform tension to the drive web or belting and to cushion-envelop surface or terrain irregularities. Such devices have required careful attention so that the springs accommodate the size and weight of the driver and/or passengers, and/or pay load. Then, adjustment must be further made to accommodate variant snow conditions. Such prior art devices are unable to be adjusted in the field and when imbalances of tension occur on the track or webbing, the track runs slack, the drive elements skip or miss and a very inefficient power application results. Applicant knows of no prior art devices which approximate the structure or result obtained from the structure described.

Accordingly, the principal object of the present invention is to provide a new and improved suspension system for tracked vehicles and in particular vehicles known as snowmobiles.

Another object is to teach a parallelogram flexural track suspension which results in uniformity of tensioning of the drive track under both high and low torque loads and under variant terrain conditions.

Another object is to provide a suspension system for tracked vehicles which is adjustable during use to accommodate itself to variant loads applied to the vehicle and to adapt to the snow or ice conditions which characterizes the terrain.

Still another object is to teach a suspension system for tracked vehicles which makes no pretense of flexure at ground engagement in any local sense, but that resiliently absorbs shock by total repositioning of the ground engaging portion of the track in such a manner as to avoid slack conditions in the track element.

Still another object is to provide a track suspension system for tracked vehicles which will accommodate a positive or cog wheel type drive as contrasted with frictional driving systems so that the life of the track can be materially extended.

Other objects including economy of construction and installation combined with rugged dependability and easy repair will be apparent to those skilled in the art as the description proceeds.

GENERAL DESCRIPTION

In general, a suspension system for tracked vehicles is provided which includes two fixed axes of support in the frame of the vehicle fore and aft connected in parallelogram fashion to a lower frame and with an intermediate buttress against which an air cushion is operative. The fixed axes are connected to respective ends of a lower frame member in equidistant relationship so that the lower frame is connected by frame extenders to the fixed axes and an enveloping track then describes a constant parallelogram relationship varied only by the distance between the line of the frame and the line between the two fixed points as represented by the profile position of the axes. The lower frame structure is connected resiliently to the body of the snowmobile at the fixed axes in a manner such that the lower frame can be pushed away from the snowmobile body by an increase in pressure in the pneumatic spring intermediate the ends of the suspension structure. In addition, a stabilizing shock absorber is connected to the rearmost of the fixed axes and to the lower frame so that surge imbalance is avoided and a constant resilient force is applied to the endless track or web. The inside of the track or web is geared by the inclusion of molded bosses which cooperatively and drivably engage the cog wheels provided at the foremost fixed axes. A guide groove is provided intermediate the cast gear teeth or cogs which, as will be seen, provides a means for guiding the track against lateral displacement. Either the frame, used as a skid, or idler wheels in the grooves gives excellent total stabilization to the track or belt. Transverse bias protrude from the outer face of the continuous belt and provide driving engagement of the belt or track against snow, for example.

Plural pneumatic springs may be used and the pressure in the springs can be adjusted while running to suit the passenger load or type of snow for maximum traction. Less pressure allows the track to depress upward toward the snowmobile body and results in less bite of the track in the snow. Higher pressure causes the track to extend downwardly for increased traction. This traction adjustment capability easily adjusts the snowmobile to best control in accord with snow conditions and weight conditions.

Plural pneumatic springs may be used as between the snowmobile body and the lower frame and additional shock absorbers may be used for resilient stabilization but the lower frame of the suspension system is maintained in parallity with the upper fixed axes and uniform tension is applied in the belt or track at all times. Sudden high torque surges do not alter the excellent drive characteristics of the present suspension structure and with a pneumatic pump drivably connected to the drive engine field adjustments can be made while the snowmobile is in use.

SPECIFIC DESCRIPTION

Figure 1:
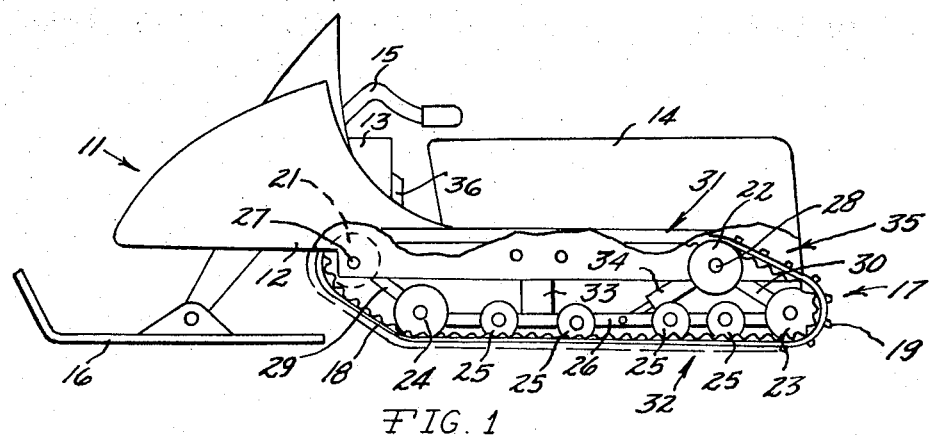
FIG. 1 is a side elevation view of a snowmobile which includes the drive and suspension system of the present invention.

Referring now to the drawings and more specifically to the FIG. 1 thereof, a snowmobile vehicle 11 is shown comprising a body or frame 12 which supports a motor 13, a seat 14, steering element 15 connected to the steering skis 16, and the tracked drive and suspension system 17. The track 18 is continuous and, as will be seen, is driven so that the external traction lugs 19 engage snow and the like to propel the vehicle 11. Steering is accomplished by the ski elements 16. Internally faced protuberances 20 on the inside surface of the track 18 are engaged by the cog wheels 21 which act as a large sprocket to drive the track 18. Alignment, as will be seen, is maintained by the uniform tensioning of the endless belt or web track 18 by the suspension system 17 and by the running of the idling wheels 22, 23, 24 and 25 in a groove between the protuberances 20. The idling wheels 25 are supported on a lower frame 26. The cog wheels 21 and the upper idling wheels 22 are fixed on the axles 27 and 28 respectively and the axles 27 and 28 are journalled firmly to the body or frame 12 of the vehicle 11. A frame extension 29 depends from the axle 27 and a frame extension 30 depends from the rear axle 28 and each is connected to the lower frame 26 on axes common to the idling wheels 24 and rear idling wheels 23, respectively. Since the frame extensions 29 and 30 are pivotal on the axes formed by axles 27 and 28 and are equal in length and are connected to the lower track frame 26 at an interval equal to the distances between the axles 27 and 28, the upper and lower track runs 31 and 32 are always substantially parallel to each other and to the lower support 26. The plurality of idlers 25 on the frame 26 buttress, back-up and support the lower run 32 of the track 18 against local collapse. In some instances, with suitable friction reducing materials, such as Teflon (a trademark of I. E. DuPont de Nemours pertaining to polytetrafluoroethylenes) and Teflon coatings, the frame 26 is directly useable as a back-up or skid-like track support. As thus supported, the profile of the track 18 and suspension 17 is always that of a parallelogram. The interval between the upper and lower runs of track 31 and 32 is established by the variable spring 33, bearing against the body 12 and the lower frame 26 provides a means for selectively locating the lower frame 26 in respect to the fixed axes as represented by the axles 27 and 28. Supplemental stabilization is obtained by use of the shock absorber 34 acting between a fixed axle 28 and the frame 26. As will be appreciated, and depending on the length of the drive suspension 17 and the weight of the vehicle 11, plural variable springs 33 may be used and plural shock absorbers 34 may be applied in amplification of desired stabilization. As will be seen, the springs 33 are of the pneumatic type and can be selectively inflated while the vehicle 11 is in use. As will also be appreciated, the drive suspension system 17 can be preassembled and inserted into the drive suspension-pocket 35 and located by setting of the axles 27 and 28 and connecting the drive axle 27 for the motor 13 and gear train 36. This greatly facilitates and standardizes manufacture.

Figure 2:
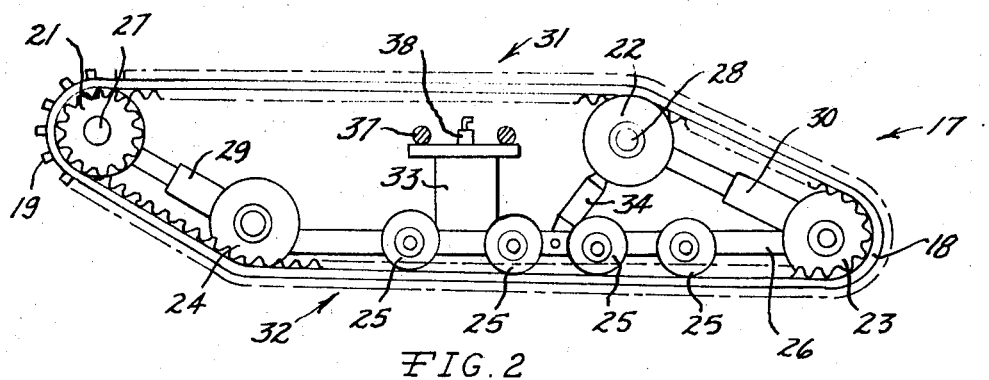
FIG. 2 is a side elevation view of the suspension system for tracked vehicles separated from the snowmobile to best reveal its construction.

By reference to FIG. 2, the construction of the drive suspension 17 in tension drive support of the track 18 is best visualized separate from the vehicle 11. The bracket members 37 running transversely of the vehicle 11 and across the drive pocket 35 provide the thrust buttress connection for the air spring cylinder 33. The valve 38 provides means for varying the spring extension and pressure while the vehicle 11 is in operation. The telescopic character of the frame extensions 29 and 30 can be appreciated and this feature allows good lateral support with tubular construction and, as will be seen, allows length adjustment so that precise equality can be established by shimming one of the extension frames 29 or 30.

Figure 3:
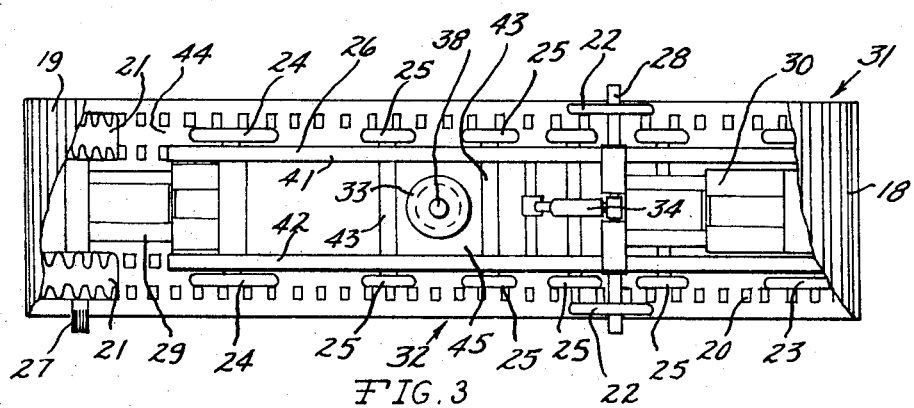
FIG. 3 is a cut-away top plan view of the tracked suspension as seen in FIG. 2, the track being cut-away to indicate the cog wheel drive and the lower support frame.

In FIG. 3 with a portion of the upper run 31 of track 18 removed, the lower frame 26 is best appreciated as ladder-form with rails 41 and 42 and tubular transverse journal spacers 45 in support of the pairs of idler wheels 25, 24, 23 and 22. The idler wheels 22 run outboard of the groove 44 (between rows of protuberances 20) and provide an outer control over any lateral shifting tendencies in the track 18. The impingement of the drive cog wheels 21 on the protuberances 20 with the raised center portion of the cog wheels 21 running in the groove 44 also provides the requisite lateral control over the track 18 while under power. The variable pneumatic spring 33 is secured to a plate 45 which aligns and bears on the rails 41 and 42. Air connection 38 is visible on the top of the spring 33.

Figure 4:
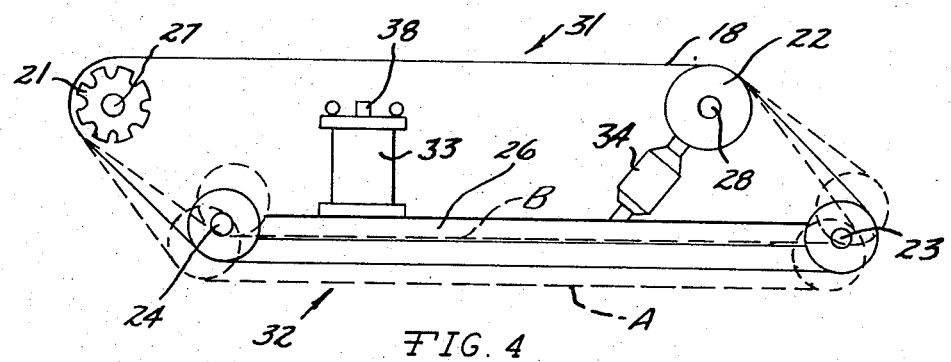
FIG. 4 is a schematized elevational view of the present invention and indicating the repositioning of the frame against the pneumatic spring and shock absorber and resulting in constant tensioning of the driven track and also indicating the manner of selective extending or retracting of the track in relation to the ski mount.

In FIG. 4, the function of the parallelogram support and drive system is readily appreciated in the context of extension and contraction by selected inflation of the spring 33. Axles 27 and 28 supporting the cog wheels 21 and the upper idling wheels 22 are fixed in spaced apart relation. The wheels 24 and 23 establish an equal spaced relationship to the distance between axles 27 and 28, and the interval is maintained by the lower frame 26 which supports the wheels 23 and 24. However, as previously seen, the interval between wheels 21 and 24 at the front, as shown, and 22 and 23 at the back is established by frame extensions 29 and 30 (not shown in FIG. 4) which are pivotal to the axles 27 and 28 and to the frame 26. These extension frame intervals are made equal and movement of the frame 26 is exactly parallel to the upper run 31 of the track 18. Without more the lower run 32 would collapse in parallelogram fashion against the upper run 31. The pneumatic spring 35, however, acts against the vehicle frame 12 through the brackets 37 and acts at the other end against the frame 26 through the plate 45. When the spring 33 is fully extended by inflation the suspension system 17 assumes the track position indicated by the lower broken lines A. When the spring 33 is collapsed, the track position is indicated by the upper broken lines B. The full line intermediate the broken line intermediate the broken lines is the mean elevation of the steering skis 16 so that inflation or deflation of the spring 33 selects a track running elevation at, above, or below, the steering skis 16. This markedly improves steering on selected types of snow, for example, powder or crust by throwing thrust of the weight of the vehicle 11 forwardly or rearwardly as desired and in accord with variant weight of passengers.

Figure 5:
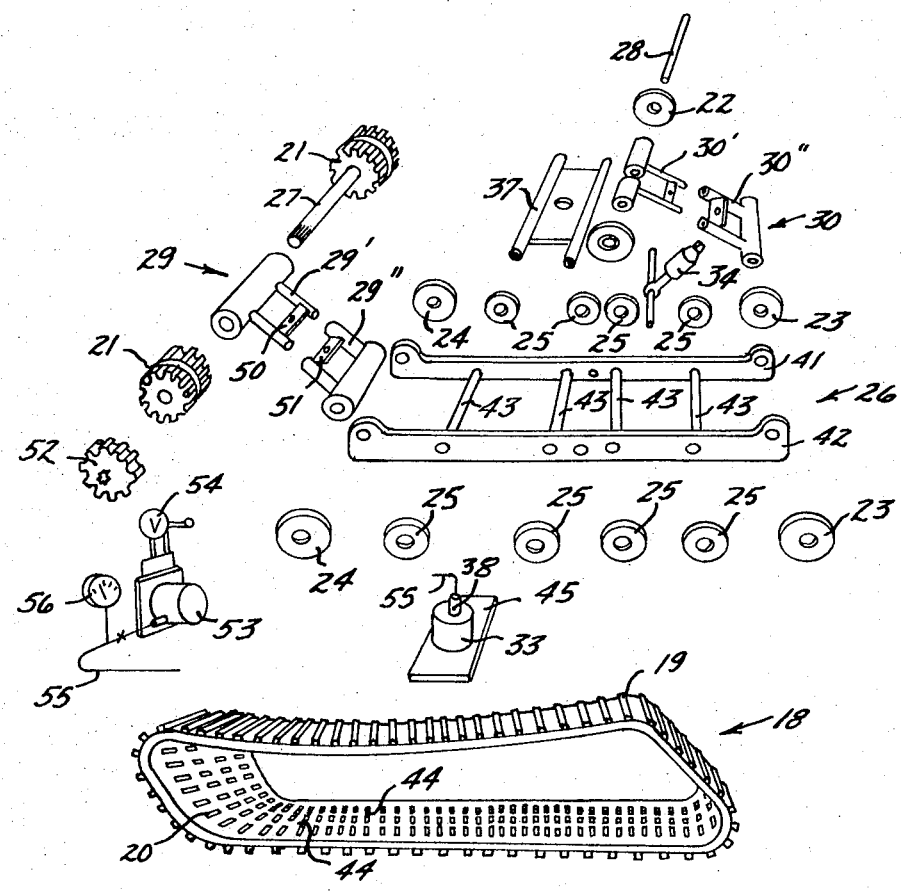
FIG. 5 is an exploded perspective sketch of the principal parts comprising the tracked suspension system of the present invention.

FIG. 5 assists in visualizing the assembly of the suspension system 17 and without repeating all of the prior description, the reference numerals are repeated where applicable and the telescopic character of the frame extensions 29 and 30 are better appreciated. The upper portions 29' and 30' respectively, telescope in close tubular fit in the lower portions 29" and 30" respectively. To assure accurate adjustment of the equal length in both extension frames 29 and 30, a shim is easily placed between the buttress plates when the parts of 29 and 30 are brought together. The buttresses 50 and 51 are pieced and are bolted together in assembly.

The spline end on the shaft or axle 27 accommodates the coaxial attachment to the gear 52 secured to the output of the transmission 36 of motor 13. The shaft 27 is thus driven and the cog wheels 21 are keyed to the shaft 27 and drive the tensioned track or belt 18. The pump 53 actuated by manual valve 54 provides a means for inflation of the pneumatic spring 33 through the air line 55. A gage 56 indicates the pressure in the pneumatic spring 33. The pump 53 may be vacuum operated from the motor 13 or may in some instances be pressure or mechanically connected to the motor 13.

Stub shafts journalling details and bearing fasteners are not shown in the FIG. 5 for reasons of simplifications. As will be appreciated, from FIG. 5, the structure can be assembled wholly separate from the vehicle and attached to the shafts 27 and 28 to establish the fixed support.

Figure 6:
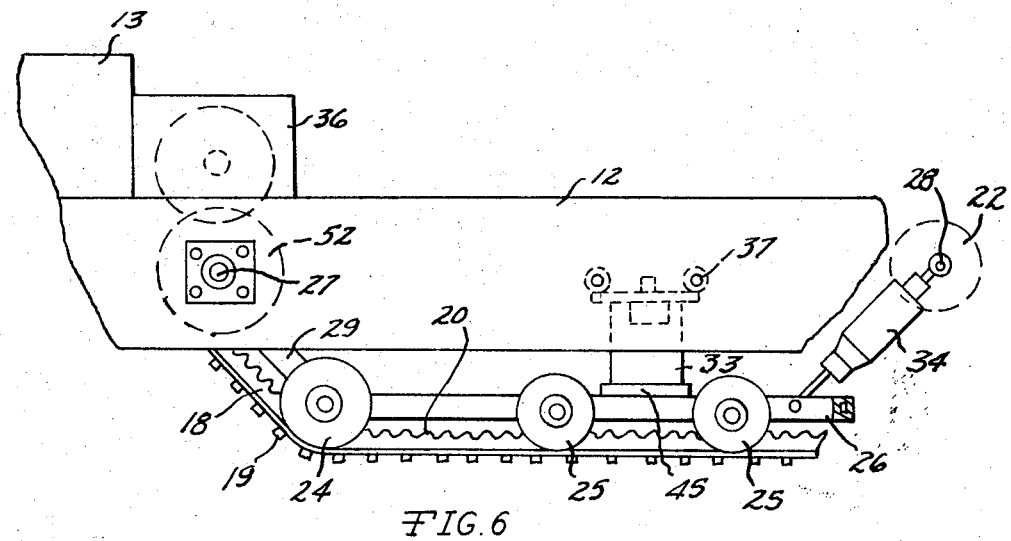
FIG. 6 is a side elevation view of a suspension system in accord with the present invention installed in a snowmobile drive track pocket and supported by the frame walls of the snowmobile vehicle.

FIG. 6 is a slightly enlarged to indicate the fastening of the shock absorbing element 34 acting on the rear fixed axle 28 and against the lower frame 26 by way of the transverse bar 60. This also shows the spur gear 52 meshed with drive gears in the transmission 36. The simple journalling of the shaft 27 in the vehicle frame 12 is also appreciated. The shaft 28 is similarly supported on the vehicle frame 12. The bracket 37 in upper support of the pneumatic spring 33 is also shown rigidly secured to the vehicle frame 12.

Figure 7:
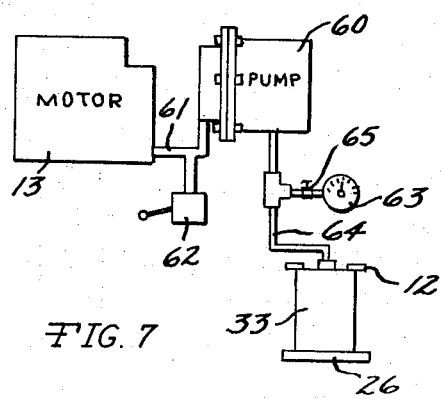
FIG. 7 is a schematic view indicating the motor driven pump, selectively operated from a dash mounted valve and with a gage indicator to show the pressure in the pneumatic spring element.

In FIG. 7 the vehicle motor 13 (schematically shown) is seen to supply a source of vacuum, while running, to the air pump 60. The vacuum conduit 61 is provided with a manually operable valve 62 so that the pump 60 is actuated as a necessary or desired to inflate the air or pneumatic spring 33 thrusting between the vehicle frame 12 and the lower suspension frame 26. An air pressure 63 gage is provided in the inflation line 64 and bleed valve 65 is provided between pump 60 and gage 63 for selected deflation of the pneumatic spring 33. The inflation line 64 runs through the vehicle structure to the pneumatic spring 33. These adjustments can be made while the engine 13 is running and while the vehicle 11 is in motion.

Figure 8:
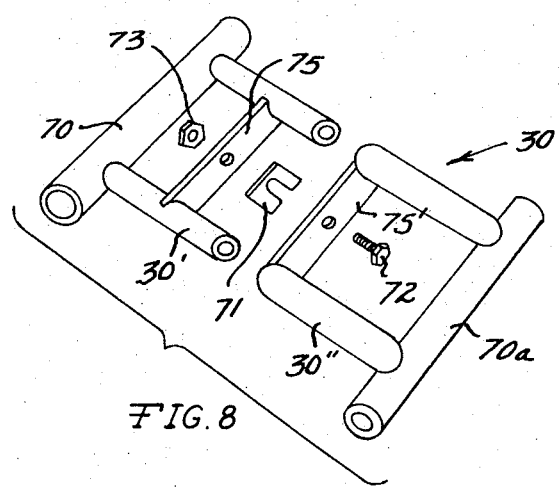
FIG. 8 is a perspective sketch of the frame extension and fixed wheel connector and indicating how a shim can be inserted between the two telescoped elements of the frame extension to equalize the distance between fore and aft frame extenders.

The FIG. 8 shows the telescopic character of the frame extensions 29 and 30 pivotal as between vehicle frame 12 at the tubular end portions 70 and 70a. The frame tube 30' telescopes into the frame tube 30" and the stop barriers 75 and 75', upon engagement, establish the nested spaced relationship and are fixed in position by the bolt 72 and nut 73. The shim 71 can be inserted between the stop barriers 75 and 75' to assure accurate equality in length as between the frame extensions 29 and 30.

In performance, it will be best appreciated in FIG. 4 that the lower suspension frame 26 moves on impact rather than permitting the track to flex as occurs with conventional ground conforming and spring loaded bogies. The parallelogram relation is maintained at all times and the elongation or depression of the air spring 33 conforms the suspension system to various riders and to various snow terrain conditions. The consequent ride is comfortable and control of the vehicle is sensitive. Maximum torque is delivered by the motor to the track and on power surges the track remains properly tensioned and under positive drive engagement. Hence, the tracked vehicle using the presently described suspension yields superior performance in the field. At high speeds variant terrain conditions the presently described suspension provides a superior performance. In addition, the presently described suspension can be fully preassembled for easy assembly, insertion and connection in the drive pockets of snowmobile chassis. Tracked vehicles, so equipped, do not provide local flexure of the track at ground engagement, but the entire lower run of the track and track frame resiliently absorbs shock by total repositioning of the ground engaging portion of the track so as to avoid slack in the track at all times by maintenance of a parallelogram support. Hence, peak torque loads followed by drop-in-torque does not result in a loosened track and a positive drive tension at all times assumes positive cog wheel-drive engagement.

Having thus described my invention and one complete embodiment thereof, others skilled in the art will likely see improvements and modifications therein. Such modifications and improvements are intended to be included herein limited only by the scope of the hereinafter appended claims.

I claim:

1. A suspension system for tracked vehicles comprising:

two parallel spaced apart axles, at least one of said axles being driven;

a lower frame element in spaced relation beneath said two axles;

a pair of frame extenders, one depending from each of said fixed axles and supporting said lower frame, said extenders being equal in length and parallel to each other when connected to the fixed axles and said lower frame;

an endless drive track supported internally on said fixed axles and said lower frame and driven by the driven one of said axles; and a variable compression spring means acting against the lower frame and said fixed axles whereby said lower frame is controllably depressible and extendable toward and away from said fixed axles in the manner of a parallelogram.

2. A suspension system in accord with claim 1 and including at least one shock absorber acting between said fixed axles and said lower frame.

3. A suspension system for drive tracked vehicles such as snowmobiles comprising:

a vehicle body;

a motor on said body;

a pair of parallel spaced apart journal structures supported by said body in fore and aft relation;

a drive shaft in one of said pairs of journals and driveably connected to said motor;

an idling axle in the other of said pair of journals;

drive cog wheels connected to said driven axle;

idler wheels on said idler axle;

a frame extender depending from each of said journal supported axles;

a lower frame connected at its ends to said frame extenders and in constant parallel relation beneath said axles;

at least one penumatic spring intermediate said vehicle body and said lower frame;

at least one shock absorbing stabilizer acting at one end on said lower frame and at the other end on said axles; an an endless track internally engaged against said cog wheels and in running relation over said idler wheels and said lower frame and under constant tension by the action of said pneumatic spring acting on said lower frame.

4. A suspension system in accord with claim 3 and including a pump driven by said motor and means connecting said pump to said pneumatic spring whereby said lower frame may be relatively extended or retracted by selected increase or reduction in pressure on said pneumatic springs.

5. A suspension system in accord with claim 4 and including valve and pump means connected for selective drive by said motor whereby pressure to said pneumatic spring is applicable during driving operation of said device.

6. A suspension system in accord with claim 4 wherein said lower frame includes a plurality of idling wheels each of said wheels supportably engaging the internal surface of said track and whereby movement of said lower frame repositions said wheels without changing tension on said track.

7. A track support structure for snowmobiles and the like comprising:

an endless belt-like track having internal protuberances and external transverse cleats;

a pair of spaced apart fixed axles, one of said axles including a pair of cog drive wheels engaging said protuberances in said track and the other of said axles having wheels in the form of idlers;

a wheeled lower frame dependingly secured at its ends to said axles and said wheels on said lower frame guidably and supportably engaging the inner surface of said track;

an extendable and retractable spring between said axles and said lower frame; and shock absorption means stabilizing said lower frame in respect to said axles whereby smooth parallelogram performance is maintained with constant selected tension on said track.

* * * * *